(12) United States Patent
Ghosal et al.

(10) Patent No.: US 9,462,232 B2
(45) Date of Patent: *Oct. 4, 2016

(54) SYSTEM AND METHOD OF MANAGING PROTECTED VIDEO CONTENT

(71) Applicants: AT&T Intellectual Property I, L.P., Atlanta, GA (US); The Regents of the University of California, Oakland, CA (US)

(72) Inventors: Dipak Ghosal, El Cerrito, CA (US); Canhui Ou, Danville, CA (US); Zhi Li, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/649,893

(22) Filed: Oct. 11, 2012

(65) Prior Publication Data

US 2013/0055413 A1 Feb. 28, 2013

Related U.S. Application Data

(63) Continuation of application No. 11/649,381, filed on Jan. 3, 2007, now Pat. No. 8,312,558.

(51) Int. Cl.
*G06F 21/00* (2013.01)
*H04N 7/167* (2011.01)
*H04N 21/254* (2011.01)
*H04N 21/434* (2011.01)
(Continued)

(52) U.S. Cl.
CPC .......... *H04N 7/1675* (2013.01); *H04N 21/254* (2013.01); *H04N 21/434* (2013.01); *H04N 21/44* (2013.01); *H04N 21/4788* (2013.01); *H04N 21/8358* (2013.01)

(58) Field of Classification Search
CPC ................................ G06F 17/30; G06F 21/00
See application file for complete search history.

(56) References Cited

U.S. PATENT DOCUMENTS

| | | | |
|---|---|---|---|
| 4,739,398 | A | 4/1988 | Thomas et al. |
| 6,226,618 | B1 | 5/2001 | Downs et al. |

(Continued)

FOREIGN PATENT DOCUMENTS

| | | |
|---|---|---|
| WO | 03032136 | 4/2003 |
| WO | 2005064885 | 7/2005 |
| WO | 2007053112 | 5/2007 |

OTHER PUBLICATIONS

Robles, et al., Towards a Content-Based Video Retrieval System Using Wavelet-Based Signatures, 7th IASTED International Conference on Computer Graphics and Imaging-CCIM, pp. 344-349, 2004.

(Continued)

*Primary Examiner* — Helai Salehi
(74) *Attorney, Agent, or Firm* — Toler Law Group, PC

(57) ABSTRACT

A method includes inspecting a packet stream sent from a set-top box device via a network. The packet stream includes video content that is divided into a plurality of subsections. The method includes generating a plurality of signatures by applying a wavelet transform to each of the plurality of subsections, and determining a match between the video content and protected video content based at least in part on a comparison of the plurality of signatures to one or more stored signatures generated based on the protected video content.

20 Claims, 6 Drawing Sheets

(51) Int. Cl.
*H04N 21/44* (2011.01)
*H04N 21/4788* (2011.01)
*H04N 21/8358* (2011.01)

(56) References Cited

U.S. PATENT DOCUMENTS

| | | | |
|---|---|---|---|
| 6,332,030 B1 | 12/2001 | Manjunath et al. | |
| 6,510,458 B1 | 1/2003 | Berstis et al. | |
| 6,556,689 B1 | 4/2003 | Xia et al. | |
| 7,020,206 B1 * | 3/2006 | Acharya et al. | 375/240.27 |
| 7,064,790 B1 | 6/2006 | Varma et al. | |
| 7,209,571 B2 | 4/2007 | Davis et al. | |
| 7,936,824 B2 * | 5/2011 | Lee | 375/240.19 |
| 2002/0032864 A1 | 3/2002 | Rhoads et al. | |
| 2002/0126872 A1 | 9/2002 | Brunk et al. | |
| 2003/0037010 A1 * | 2/2003 | Schmelzer | 705/67 |
| 2003/0103461 A1 | 6/2003 | Jorgenson | |
| 2003/0174859 A1 | 9/2003 | Kim | |
| 2003/0191764 A1 | 10/2003 | Richards | |
| 2004/0039926 A1 | 2/2004 | Lambert | |
| 2004/0243634 A1 | 12/2004 | Levy | |
| 2004/0250080 A1 | 12/2004 | Levy et al. | |
| 2005/0022229 A1 | 1/2005 | Gabriel et al. | |
| 2005/0027766 A1 | 2/2005 | Ben et al. | |
| 2005/0050332 A1 | 3/2005 | Serret-Avila et al. | |
| 2005/0154681 A1 | 7/2005 | Schmelzer | |
| 2005/0183143 A1 | 8/2005 | Anderholm et al. | |
| 2005/0204037 A1 | 9/2005 | Levy | |
| 2006/0047952 A1 | 3/2006 | Van Den Heuvel et al. | |
| 2006/0062426 A1 | 3/2006 | Levy et al. | |
| 2006/0130118 A1 | 6/2006 | Damm | |
| 2006/0153296 A1 | 7/2006 | Deng | |
| 2006/0184454 A1 | 8/2006 | Ananda | |
| 2006/0184961 A1 | 8/2006 | Lee et al. | |
| 2006/0187358 A1 | 8/2006 | Lienhart et al. | |
| 2006/0272026 A1 | 11/2006 | Niwano et al. | |
| 2007/0033408 A1 | 2/2007 | Morten | |
| 2007/0061835 A1 | 3/2007 | Klein, Jr. et al. | |
| 2007/0063884 A1 | 3/2007 | Iwamura et al. | |
| 2007/0100701 A1 | 5/2007 | Boccon-Gibod et al. | |
| 2007/0110089 A1 | 5/2007 | Essafi et al. | |
| 2007/0122108 A1 | 5/2007 | Bontempi | |
| 2007/0124796 A1 | 5/2007 | Wittkotter | |
| 2007/0124822 A1 | 5/2007 | Liu | |
| 2007/0136782 A1 | 6/2007 | Ramaswamy et al. | |
| 2007/0143219 A1 | 6/2007 | Shen et al. | |
| 2007/0156694 A1 | 7/2007 | Lim | |
| 2007/0185840 A1 | 8/2007 | Rhoads | |
| 2007/0204078 A1 | 8/2007 | Boccon-Gibod et al. | |
| 2007/0220266 A1 | 9/2007 | Cooper et al. | |
| 2007/0260643 A1 | 11/2007 | Borden et al. | |
| 2007/0289022 A1 | 12/2007 | Wittkotter | |
| 2008/0059536 A1 | 3/2008 | Brock et al. | |
| 2008/0134175 A1 | 6/2008 | Fitzgerald et al. | |
| 2008/0134176 A1 | 6/2008 | Fitzgerald et al. | |
| 2008/0134178 A1 | 6/2008 | Fitzgerald et al. | |
| 2008/0163288 A1 | 7/2008 | Ghosal et al. | |
| 2008/0231595 A1 | 9/2008 | Krantz et al. | |
| 2008/0256647 A1 | 10/2008 | Kim et al. | |
| 2009/0131123 A1 | 5/2009 | Coersmeier et al. | |
| 2009/0157869 A1 | 6/2009 | Cleary | |

OTHER PUBLICATIONS

Non-Final Office Action for U.S. Appl. No. 11/649,381 mailed Oct. 13, 2009, 207 pages.
Final Office Action for U.S. Appl. No. 11/649,381 mailed Apr. 14, 2010, 56 pages.
Final Office Action for U.S. Appl. No. 11/649,381 mailed Mar. 16, 2011, 35 pages.
Non-Final Office Action for U.S. Appl. No. 11/649,381 mailed Aug. 4, 2011, 39 pages.
Notice of Allowance or U.S. Appl. No. 11/649,381 mailed Apr. 19, 2012, 15 pages.
Notice of Allowance for U.S. Appl. No. 11/649,381 mailed Jul. 19, 2012, 13 pages.

* cited by examiner

SYSTEM AND METHOD OF MANAGING PROTECTED VIDEO CONTENT

CLAIM OF PRIORITY

The present application claims priority from and is a continuation of U.S. patent application Ser. No. 11/649,381 filed on Jan. 3, 2007 and entitled "SYSTEM AND METHOD OF MANAGING PROTECTED VIDEO CONTENT", the contents of which are expressly incorporated herein by reference in their entirety.

FIELD OF THE DISCLOSURE

The present disclosure relates generally to managing protected video content.

BACKGROUND

Television service providers are able to deliver a wide variety of video content. Some video content may be protected by copyright or may be subject to other restrictions. Encryption technologies may not be effective to manage protected video content in every case, particularly where video content is legally decrypted upon receipt by a subscriber of a video distribution system. Thus, parties may still use subscriber devices to re-distribute protected video content without authorization.

DETAILED DESCRIPTION

The present disclosure is generally directed to a system and method of managing protected video content. In a particular embodiment, a system to manage protected video content is disclosed and includes a processor and a memory device accessible to the processor. The memory device includes instructions executable by the processor to inspect a packet stream received from a subscriber broadband interface, where the packet stream includes video content. The memory device also includes instructions executable by the processor to generate a signature based on the video content. The memory device also includes instructions executable by the processor to compare the signature with a stored signature corresponding to protected video content.

In another embodiment, the disclosure is directed to a method of managing protected video content that includes inspecting a packet stream sent by a subscriber broadband interface, where the packet stream includes video content. The method also includes generating a signature based on the video content. Further, the method includes comparing the signature with a stored signature corresponding to protected video content.

In another embodiment, the disclosure is directed to a method of managing protected video content that includes reading a first packet stream sent by a video server to a set-top box coupled to a subscriber broadband interface, where the packet stream is related to protected video content. The method also includes generating a signature corresponding to the protected video content and storing the signature at a signature store. The method also includes providing the signature to a video content management device for comparison with a second signature corresponding to a second packet stream sent from the subscriber broadband interface.

In another embodiment, the disclosure is directed to a computer-readable medium tangibly embodying instructions executable by a processor to inspect a packet stream received from a subscriber broadband interface, where the packet stream includes video content. The computer-readable medium also includes instructions executable by the processor to generate a signature based on the video content and to compare the signature with a stored signature corresponding to protected video content. Further, the computer-readable medium includes instructions executable by the processor to store data indicating that the protected video content has been re-distributed from the subscriber broadband interface when the signature matches the stored signature.

Figure 1:
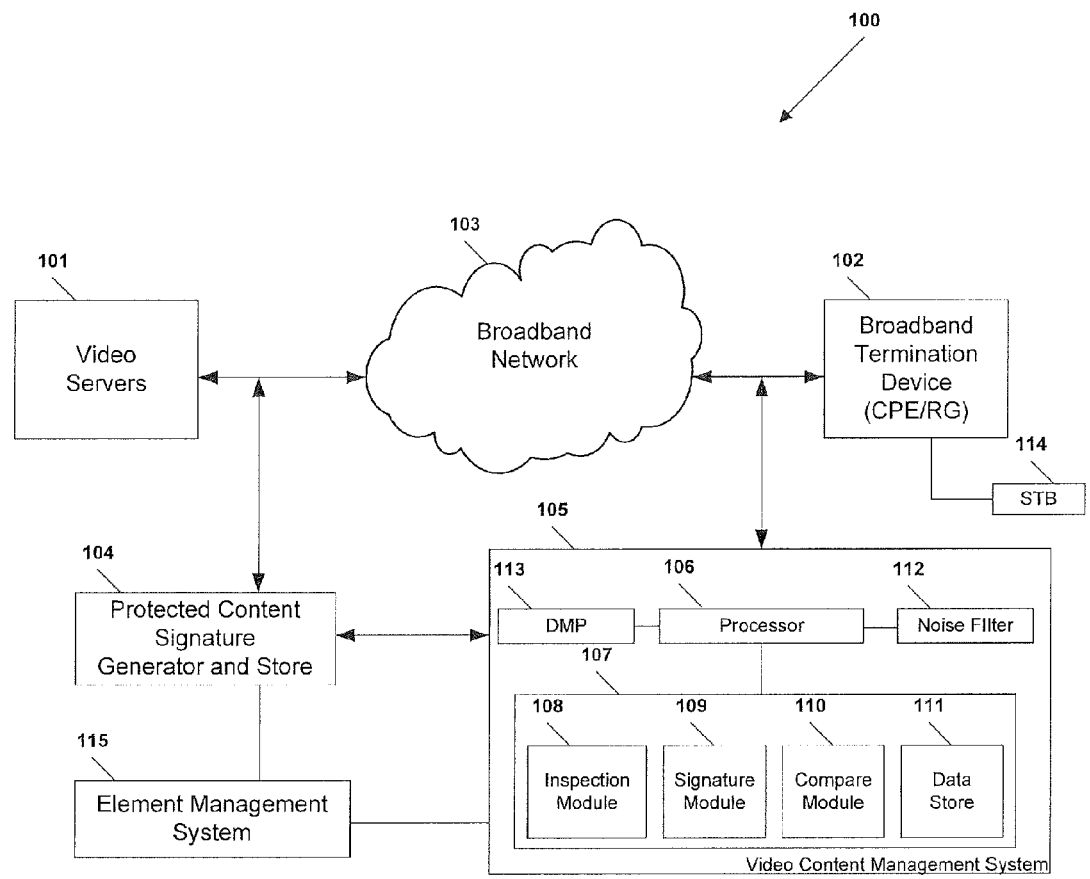
FIG. 1 is a block diagram of a particular illustrative embodiment of a system to manage protected video content.

Referring to FIG. 1, a particular illustrative embodiment of a system to manage protected video content is illustrated and is generally designated 100. As shown, the system 100 includes one or more video servers 101 communicating with a broadband termination device 102 via a broadband network 103. In a particular embodiment, the video server(s) 101 can be located at a central or regional video head-end of a video distribution system, such as an Internet Protocol Television (IPTV) system. In an illustrative embodiment, the broadband termination device 102 can be a customer premises equipment (CPE) device, such as a residential gateway, of a subscriber. The broadband termination device 102 can facilitate communication, for example, between a set-top box device 114 and the broadband network 103. The broadband network 103 can be a private or public IP network, such as a private access network of an Internet Protocol Television (IPTV) system.

In a particular embodiment, the video server(s) 101 can communicate with a protected content signature generator and store 104. Further, the protected content signature generator and store 104 can communicate with a video content management system 105 that has access to communications between the broadband network 103 and the broadband termination device 102. In an illustrative, non-limiting embodiment, the protected content signature generator and store 104, and the video content management system 105, can communicate with an element management system 115.

In a particular illustrative embodiment, a packet stream carrying protected video content can be sent from the video server(s) 101 to the broadband termination device 102 via the broadband network 103. The packet stream can be read from the video server(s) 101 by the protected content signature generator and store 104, and the protected content signature generator and store 104 can generate and store one or more signatures associated with the video content. Alternatively, the protected content signature generator and store 104 can pre-process the video content to generate and store the signature(s) prior to the packet stream being sent by the video server(s) 101. In a particular embodiment, the stored signature(s) can be associated with data identifying the broadband termination device 102. In another embodiment, the protected content signature generator and store 104 can store data indicating which video content has been sent to the broadband termination device 102.

In an illustrative embodiment, a signature can be generated by applying a wavelet transform to a plurality of subsections of the video content. For example, the video content can include Moving Picture Experts Group (MPEG) content having a plurality of frames. The protected content signature generator and store 104 can determine a plurality of subsections of the MPEG video content based at least partially on a sequence of Intra-coded frames (I-frames), Predictive-coded frames (P-frames), or any combination thereof, within the MPEG video content. For instance, each subsection can be identified by a sequence number of an I-frame that is designated as the beginning or end of the subsection. By applying a wavelet transform, such as a Haar wavelet transform, to each of the subsections, a sequence of coefficients can be generated. The sequence of coefficients can be stored as a signature of the video content.

In a particular embodiment, the video content management system 105 can include a processor 106 and a memory device 107. The memory device 107 can include an inspection module 108 that is executable by the processor 106 to inspect a packet stream sent by the broadband termination device 102 via the broadband network 103. In a particular embodiment, packet streams sent by the broadband termination device 102 can be targeted for content-level inspection based on a volume-level analysis of packet streams sent via the broadband network 103. The inspection module 108 can be executable by the processor to inspect the video content of the video data packets via deep-packet inspection to determine the contents of each data packet in the packet stream. Where the packet stream includes video and data content, for example, the video content management system 105 can separate the packet stream into video data packets and non-video data packets via a de-multiplexer 113.

In a particular embodiment, the memory device 107 can include a signature module 109 that is executable by the processor 106 to generate one or more signatures based on video content associated with video data packets of the packet stream sent by the broadband termination device 102. In an illustrative embodiment, the generated signature(s) can include a sequence of coefficients produced by applying a wavelet transform to the video content. For example, where the video content includes MPEG video content, the wavelet transform can be applied to subsections of the MPEG video content for the same range of I-frame or P-frame sequence numbers used to generate the stored signature of the video content sent by the video server(s) 101 to the broadband termination device 102. In an illustrative embodiment, the range of sequence numbers can be adjusted to account for differences in transmission properties between the video server(s) 101 and the broadband termination device 102.

In a particular embodiment, the memory device 107 can include a comparison module 110 that is executable by the processor 106 to compare the generated signature(s) with at least one signature stored at the protected content signature generator and store 104 to determine whether the video content sent by the broadband termination device 102 includes protected video content. If the signature(s) match any stored signature(s), data indicating that protected video content has been re-distributed by the broadband termination device 102 can be stored at the data store 111, the element management system, 115, or any combination thereof. In an illustrative, non-limiting embodiment, the data can be associated with a subscriber corresponding to the broadband termination device 102. In another embodiment, the data can be related to a particular user associated with a subscriber account, based on user login information received at the set-top box device 114.

In an exemplary embodiment, the signature(s) generated by the video content management system 105 can be compared with one or more signatures of a plurality of video content stored at the protected content signature generator and store 104. For example, the generated signature(s) can be compared with stored signatures of a plurality of different movies until a match is found or the stored signatures are exhausted. In another embodiment, one or more of the plurality of stored signatures can be selected for comparison, based on data indicating video content sent by the video server(s) 101 to the broadband termination device 102.

Figure 5:
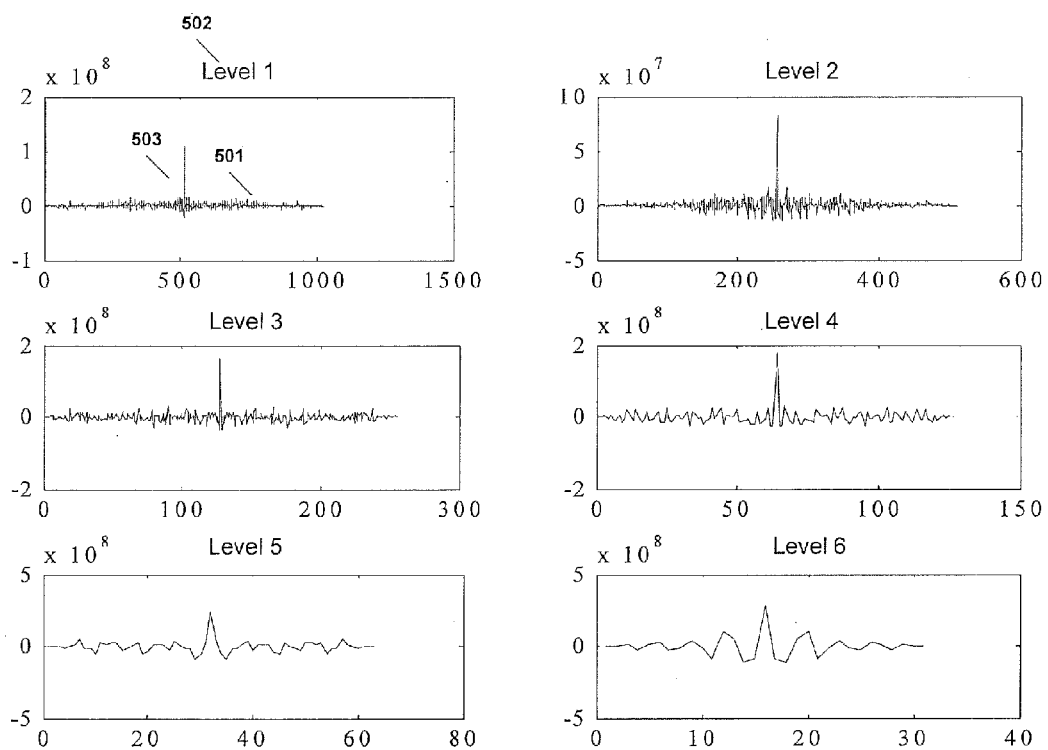
FIG. 5 is a flow diagram of a particular illustrative embodiment of cross-correlation vectors to manage protected video content.

In an illustrative embodiment, the comparison module 110 can be executable by the processor 106 to determine whether one or more of the signature(s) generated at the video content management system 105 match one or more of the signature(s) stored at the protected content signature generator and store 104, by evaluating one or more cross-correlation vectors that each compare a sequence of coefficients of a generated signature with a sequence of coefficients of a stored signature. In one example, the comparison module 110 can be executable by the processor 106 to determine whether each cross-correlation vector includes a peak that indicates a match. Examples of cross-correlation vectors are illustrated in FIG. 5.

In an illustrative, non-limiting embodiment, the video content management system 105 can include a noise filter 112, such as a Gaussian noise filter, that can remove coefficients corresponding to high-frequency portions of a signal carrying the video content sent by the broadband termination device 102. The remaining coefficients can be compared to one or more stored signatures to determine whether the video content is protected video content.

Figure 4:
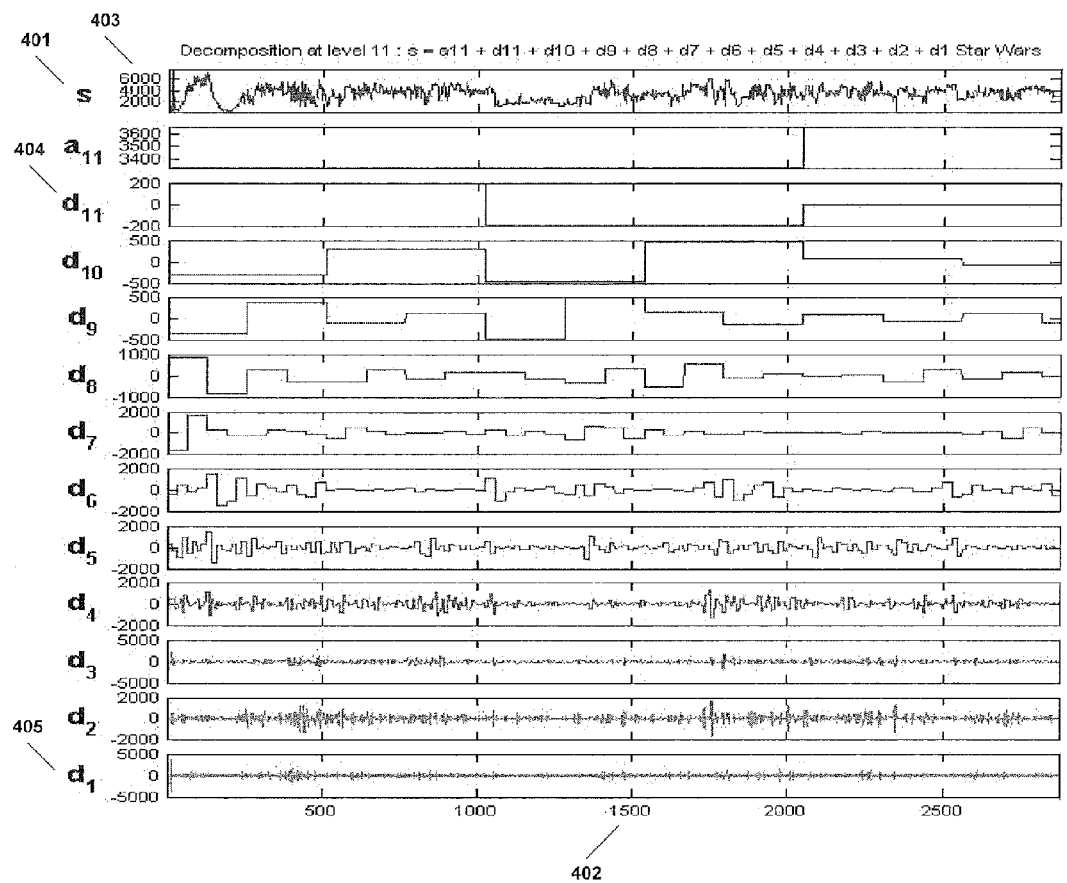
FIG. 4 is a diagram of an exemplary embodiment of signatures to manage protected video content.

In a particular embodiment, the protected content signature generator and store 104 can generate and store multiple stored signatures associated with particular video content sent by the video server(s) 101. Each stored signature can correspond to a different degree or level of resolution, such that a stored signature corresponding to a lower degree or level of resolution has fewer coefficients than a stored signature corresponding to a higher degree or level of resolution. Further, the video content management system 105 can generate a plurality of signatures related to particular video content sent by the broadband termination device 102, wherein each of the plurality of signatures corresponds to a different degree or level of resolution. Examples of signatures having different degrees or levels of resolution are illustrated in FIG. 4. One or more of the plurality of generated signatures can be compared to one or more of the multiple stored signatures, beginning at a certain degree or level of resolution and proceeding to a higher degree or level of resolution, until a desired degree or level of resolution or match certainty is reached.

In an illustrative embodiment, the various modules 108-111 can include logic, hardware, computer instructions, or any combination thereof.

Figure 2:
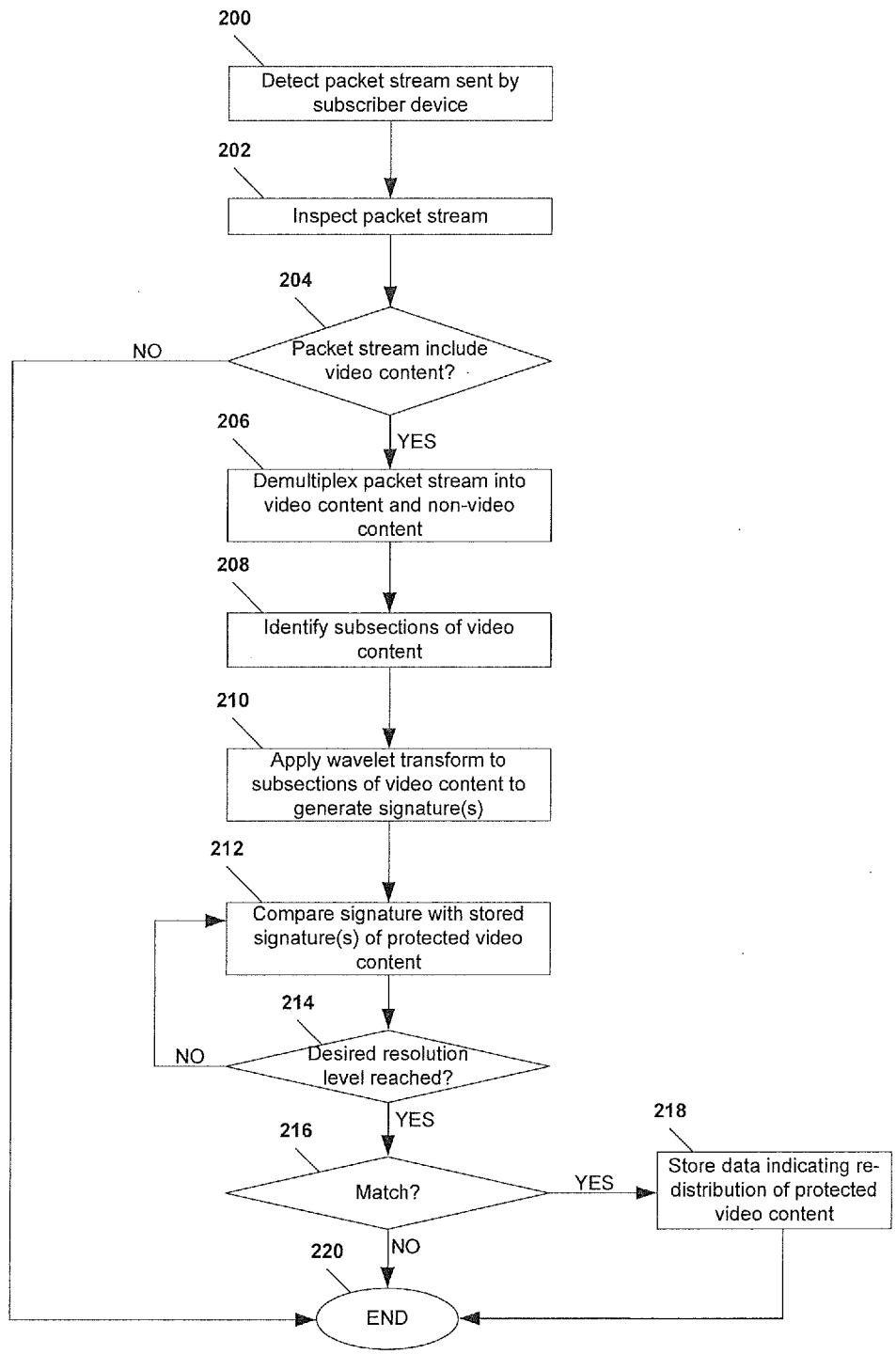
FIG. 2 is a flow diagram of a particular illustrative embodiment of a method of managing protected video content.

Referring to FIG. 2, a particular illustrative embodiment of a method of managing protected video content is illustrated. At block 200, a video content management system of an Internet Protocol Television (IPTV) system or other video distribution system detects a packet stream sent by a subscriber device, such as a residential gateway or other customer premises equipment (CPE) device. Moving to block 202, the video content management system inspects the packet stream. In an illustrative embodiment, the video content management system inspects the packet stream using a deep packet inspection (DPI) tool.

Continuing to decision node 204, the video content management system determines whether the packet stream includes video content. For example, the packet stream can include voice content (e.g., Voice-over Internet Protocol content), data content (e.g., Internet content), video content, or any combination thereof. If the video content management system determines that the packet stream does not include video content, the method terminates at 220. Conversely, in an illustrative embodiment, if the video content management system determines that the packet stream includes video content, the method can proceed to block 206, and the video content management system can demultiplex the packet stream, separating it into video content and non-video content.

At block 208, in a particular embodiment, the video content management system can identify subsections of the video content included in the packet stream. For instance, where the video content includes Moving Picture Experts Group (MPEG-x) content, the video content management system can identify a plurality of I-frames within the MPEG-x content. In an illustrative embodiment, each I-frame can be associated with a different sequence number, and the video content management system can designate each I-frame as the beginning or end of a subsection of the video content.

Advancing to block 210, the video content management system can apply a wavelet transform, such as a Haar wavelet transform, to each of the video content subsections to generate one or more signatures corresponding to the video content. Each signature includes a sequence of coefficients produced by applying the wavelet transform to the plurality of I-frames. In an illustrative, non-limiting embodiment, the video content management system can generate a plurality of signatures corresponding to the video content. Each of the plurality of signatures can correspond to a different scale or degree of resolution, such as a lowest degree of resolution having a fewest number of coefficients, a highest degree of resolution having a greatest number of coefficients, and other degrees of resolution having varying numbers of coefficients.

Proceeding to block 212, the video content management system compares one or more of the generated signatures to one or more signatures stored at a signature store of the video distribution system. In an illustrative embodiment, each of the stored signature(s) can include a sequence of coefficients generated by applying the same wavelet transform used by the video content management system to I-frames having the same or similar range of sequence numbers in video content sent to the subscriber CPE device. In an illustrative embodiment, the video content management system can compare signatures via computer instructions executable to search for a peak in a cross-correlation vector corresponding to two compared signatures.

Moving to decision node 214, in a particular embodiment, the video content management system can determine whether a desired scale or degree of resolution has been reached in the comparison between the generated signature(s) and the stored signature(s). If the desired scale or degree of resolution has not been reached, the method can return to block 212, and the video content management system can continue to compare generated signatures with stored signatures until a desired degree of resolution is reached. If the desired scale or degree of resolution has been reached, the method proceeds to decision step 216, and the video content management system determines whether a match exists between one or more of the generated signature(s) and one or more stored signature(s) having the same scale or degree of resolution. If a match exists, the method moves to block 218, and the video content management system can store data indicating that protected video content has been redistributed from the subscriber CPE device. The video content management system can store the data locally or at another device of the video distribution system. The method terminates at 220.

Figure 3:
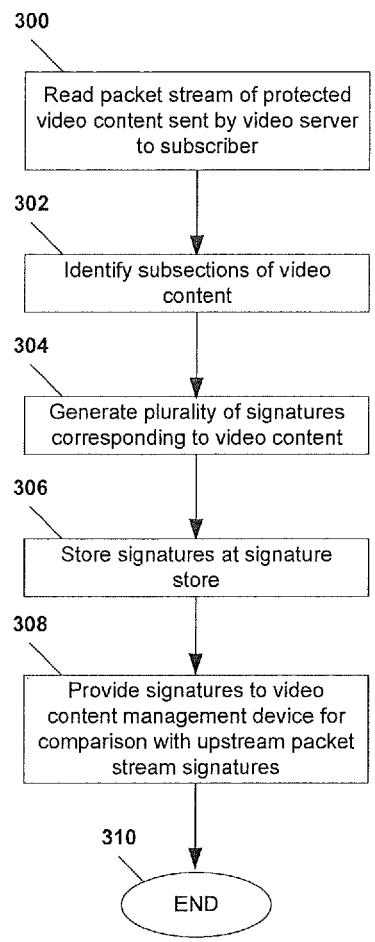
FIG. 3 is a flow diagram of a second particular illustrative embodiment of a method of managing protected video content.

Referring to FIG. 3, a second particular illustrative embodiment of a method of managing protected video content is illustrated. At block 300, a video content signature device of an Internet Protocol Television (IPTV) system or other video distribution system reads a packet stream of protected video content sent by a video server to a subscriber. Moving to block 302, in a particular embodiment, the video content signature device identifies a plurality of subsections of the video content. Proceeding to block 304, in an illustrative embodiment, the video content signature device generates a plurality of signatures corresponding to the protected video content.

At block 306, the video content signature device stores the plurality of signatures. In a particular embodiment, the video content signature device can associate the plurality of signatures with an identification of customer premises equipment (CPE) of the subscriber. In an alternative embodiment, the video content signature device can store the plurality of signatures and can store data indicating which video content has been sent to the CPE of the subscriber.

Moving to block 308, the video content signature device can provide the plurality of signatures to a video content management system of the video distribution system for comparison with a plurality of signatures generated by the video content management system. In an illustrative, non-limiting embodiment, the video content signature system can receive a query from the video content management system for signatures of video content sent to the subscriber CPE. The method terminates at 310.

The embodiments of the methods disclosed are given for illustrative purposes only. In other embodiments, aspects of the methods can be performed in various sequences or simultaneously.

Referring to FIG. 4, a particular illustrative embodiment of a plurality of signatures corresponding to video content is illustrated. In the embodiment shown, a video content stream 401 includes a plurality of I-frames associated with various sequence numbers 402. In an illustrative embodiment, the video content stream 401 can be represented by a graph showing I-frame bit size 403 for each sequence number 402. A Haar wavelet transform or other wavelet transform can be applied to subsections of the video content delineated by the I-frames to generate a plurality of signatures corresponding to the video content, such as the signatures d1-d11. Each signature includes a plurality of coefficients associated with the same range of sequence numbers as the plurality of I-frames. In a particular embodiment, the plurality of signatures can include a lowest-resolution signature d11 404 having a fewest number of coefficients and a highest-resolution signature d1 405 having a greatest number of coefficients.

Referring to FIG. 5, a particular illustrative embodiment of a plurality of cross-correlation vectors to compare signatures corresponding to video content is illustrated. In the embodiment shown, a plurality of cross-correlation vectors, such as the cross-correlation vector 501, are illustrated. Each cross-correlation vector corresponds to a different level of resolution, such as Level 1 502 and other levels. In a particular embodiment, a cross-correlation peak 503 within each cross-correlation vector can indicate a match between two signatures having the same degree of resolution.

In conjunction with the configuration of structure described herein, the system and method disclosed provide management of protected video content. In a particular illustrative embodiment, a packet stream carrying protected video content can be sent from a video server to a broadband termination device via a broadband network. The packet stream can be read from the video server by a video content signature device, and the video content signature device can generate and store a signature associated with the video content. In an illustrative embodiment, a signature can be generated by applying a wavelet transform to a plurality of subsections of the video content to produce a sequence of coefficients.

In a particular embodiment, a video content management system communicating with the video content signature device can inspect a packet stream sent by the broadband termination device via the broadband network to determine whether protected video content is being re-distributed. In a particular embodiment, packet streams sent by the broadband termination device can be targeted for content-level inspection based on a volume-level analysis of packet streams sent via the broadband network. The inspection module can inspect video data packets included in the packet stream via deep-packet inspection.

In a particular embodiment, the video content management system can generate a signature based on video content associated with the video data packets. In an illustrative embodiment, the signature can include a sequence of coefficients generated by applying a wavelet transform to the video content. The video content management system can compare the signature with at least one signature stored at the video content signature device to determine whether the video content sent by the broadband termination device includes protected video content. If the signature matches a stored signature, data indicating that protected video content has been re-distributed by the broadband termination device can be stored.

Figure 6:
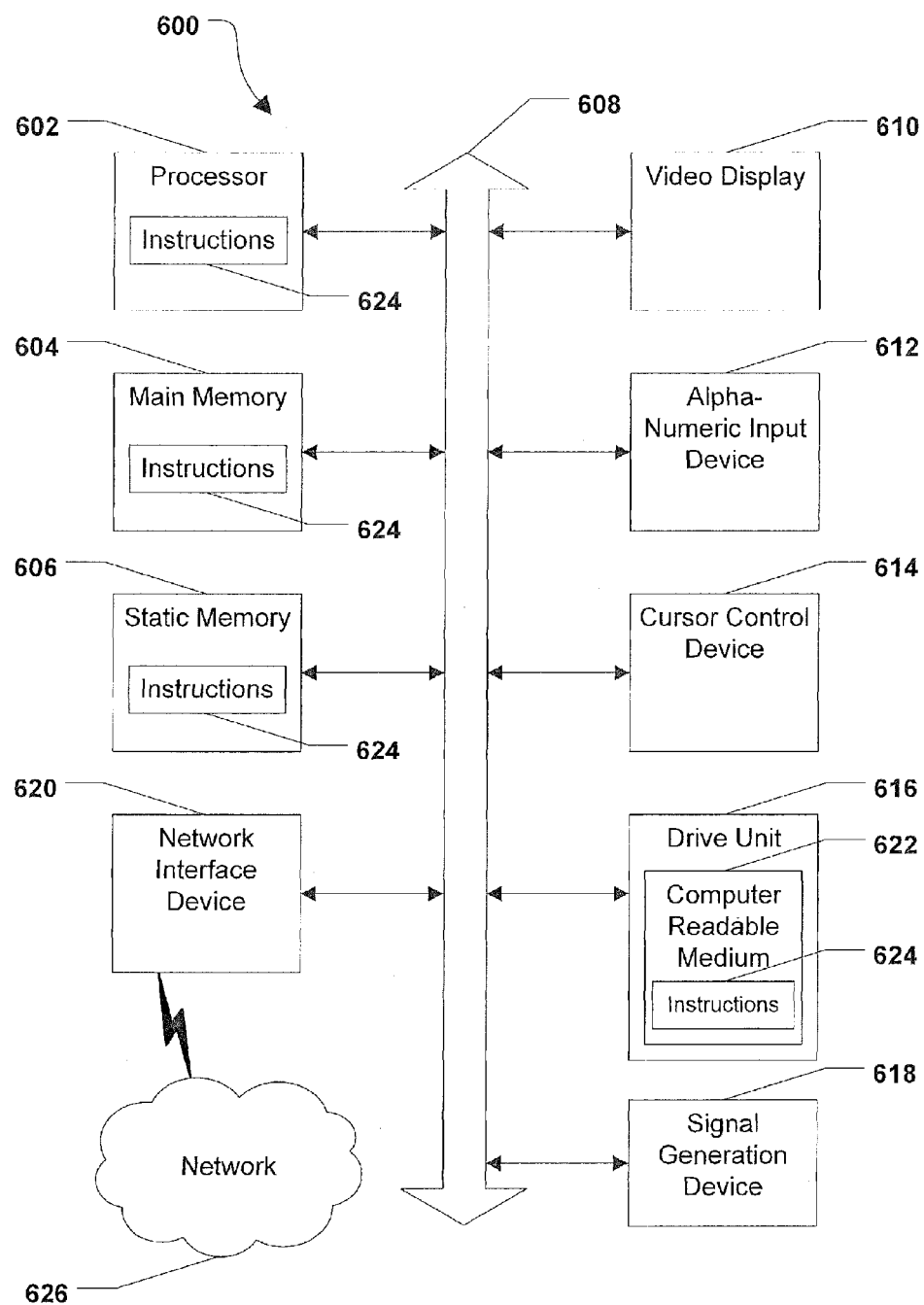
FIG. 6 is a diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices, such as the devices shown in FIG. 1.

In a networked deployment, the computer system may operate in the capacity of a set-top box device, server, customer premises equipment (CPE) device, video content management system, video content signature generator, data store, or other device, as illustrated in FIG. 1. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any non-transitory medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. Accordingly, the disclosure is considered to include a tangible storage medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   inspecting, at a processor, a packet stream at a video content management system, wherein the packet stream includes video content that is divided into a plurality of subsections;
   generating a plurality of signatures associated with the video content, wherein each signature of the plurality of signatures is generated by applying a first wavelet transform to multiple frames of a subsection of the plurality of subsections, and wherein a first signature of the plurality of signatures and a second signature of the plurality of signatures correspond to different resolution levels; and
   determining a match between the video content and protected video content based on a comparison of the plurality of signatures to a plurality of stored signatures generated based on applying a second wavelet transform to multiple frames of each of a plurality of subsections of the protected video content, wherein the comparison of the plurality of signatures to the plurality of stored signatures includes determining a peak in a cross-correlation vector corresponding to the plurality of signatures and the plurality of stored signatures.

2. The method of claim 1, wherein each subsection of the plurality of subsections is identified by a first frame that designates a beginning of the subsection and a second frame that designates an end of the subsection.

3. The method of claim 1, wherein the packet stream is sent from a customer premises equipment device via a network, the method further comprising storing data indicating that the protected video content has been re-distributed from the customer premises equipment device via the network when a particular generated signature matches a particular stored signature of the plurality of stored signatures.

4. The method of claim 1, wherein the first wavelet transform is a Haar wavelet transform, and wherein the second wavelet transform is a Haar wavelet transform.

5. The method of claim 1, wherein the packet stream is sent from a customer premises equipment device via a network, wherein a particular stored signature used to determine the match is selected from the plurality of stored signatures based on data indicating that the video content has been sent to the customer premises equipment device via the network.

6. The method of claim 1, wherein the plurality of signatures range from a first generated signature corresponding to a lowest degree of resolution to a last generated signature corresponding to a highest degree of resolution.

7. The method of claim 1, further comprising filtering a high frequency portion from a particular signature of the plurality of signatures before determining the match.

8. The method of claim 1, wherein the first signature and the second signature correspond to a particular subsection.

9. The method of claim 2, wherein an additional frame separates the first frame and the second frame.

10. The method of claim 3, wherein the particular generated signature includes a first sequence of coefficients and the particular stored signature includes a second sequence of coefficients.

11. The method of claim 6, wherein the first generated signature corresponding to the lowest degree of resolution includes a first sequence of coefficients, wherein the last generated signature corresponding to the highest degree of resolution includes a second sequence of coefficients, and wherein the first sequence of coefficients includes fewer coefficients than the second sequence of coefficients.

12. The method of claim 9, wherein the first frame, the second frame, and the additional frame each comprise an intra-coded frame or a predictive-coded frame.

13. The method of claim 3, wherein the network comprises a private access network of an interactive television system.

14. A computer-readable storage device comprising instructions that cause a processor to perform operations comprising:
inspecting a packet stream at a video content management system, wherein the packet stream is inspected using deep packet inspection, and wherein the packet stream includes video content that is divided into a plurality of subsections;
generating a plurality of signatures associated with the video content, wherein each signature of the plurality of signatures is generated by applying a first wavelet transform to multiple frames of a subsection of the plurality of subsections, and wherein a first signature of the plurality of signatures and a second signature of the plurality of signatures correspond to different resolution levels; and
determining a match between the video content and protected video content based on a comparison of the plurality of signatures to a plurality of stored signatures generated based on applying a second wavelet transform to multiple frames of each of a plurality of subsections of the protected video content, wherein the comparison of the plurality of signatures to the plurality of stored signatures includes determining a peak in a cross-correlation vector corresponding to the plurality of signatures and the plurality of stored signatures.

15. The computer-readable storage device of claim 14, wherein the packet stream is sent from a set-top box device via a network, wherein each subsection of the plurality of subsections is identified by a first frame that designates a beginning of the subsection and a second frame that designates an end of the subsection, and wherein an additional frame separates the first frame and the second frame.

16. The computer-readable storage device of claim 15, the operations further comprising storing data indicating that the protected video content has been re-distributed from the set-top box device via the network when a particular signature of the plurality of signatures matches a particular stored signature of the plurality of stored signatures.

17. The computer-readable storage device of claim 15, wherein a particular signature of the plurality of signatures includes a first sequence of coefficients and a particular stored signature includes a second sequence of coefficients, wherein determining a peak in a cross-correlation vector includes a comparison between the first sequence of coefficients and the second sequence of coefficients, wherein the peak indicates that the video content matches the protected video content.

18. A system comprising:
a processor; and
a memory storing instructions that, when executed by the processor, cause the processor to perform operations comprising:
inspecting a packet stream at a video content management system, wherein the packet stream includes video content that is divided into a plurality of subsections;
generating a plurality of signatures associated with the video content, wherein each signature of the plurality of signatures is generated by applying a first wavelet transform to multiple frames of a subsection of the plurality of subsections, and wherein a first signature of the plurality of signatures and a second signature of the plurality of signatures correspond to different resolution levels; and
determining a match between the video content and protected video content based on a comparison of the plurality of signatures to a plurality of stored signatures generated based on applying a second wavelet transform to multiple frames of each of a plurality of subsections of the protected video content, wherein the comparison of the plurality of signatures to the plurality of stored signatures includes determining a peak in a cross-correlation vector corresponding to the plurality of signatures and the plurality of stored signatures.

19. The system of claim 18, wherein the packet stream is sent from a set-top box device via a network, wherein each subsection of the plurality of subsections is identified by a first frame that designates a beginning of the subsection and a second frame that designates an end of the subsection, and wherein an additional frame separates the first frame and the second frame, and wherein the first frame, the second frame, and the additional frame each comprise an intra-coded frame or a predictive-coded frame.

20. The system of claim 19, further comprising a signature store including the plurality of stored signatures, wherein the signature store includes data indicating that the video content was sent to the set-top box, and wherein the plurality of stored signatures are associated with the set-top box.

* * * * *